July 19, 1932.    H. S. TAYLOR    1,868,437
APPARATUS FOR GATHERING AND FEEDING IN CROPS
Original Filed Oct. 5, 1928
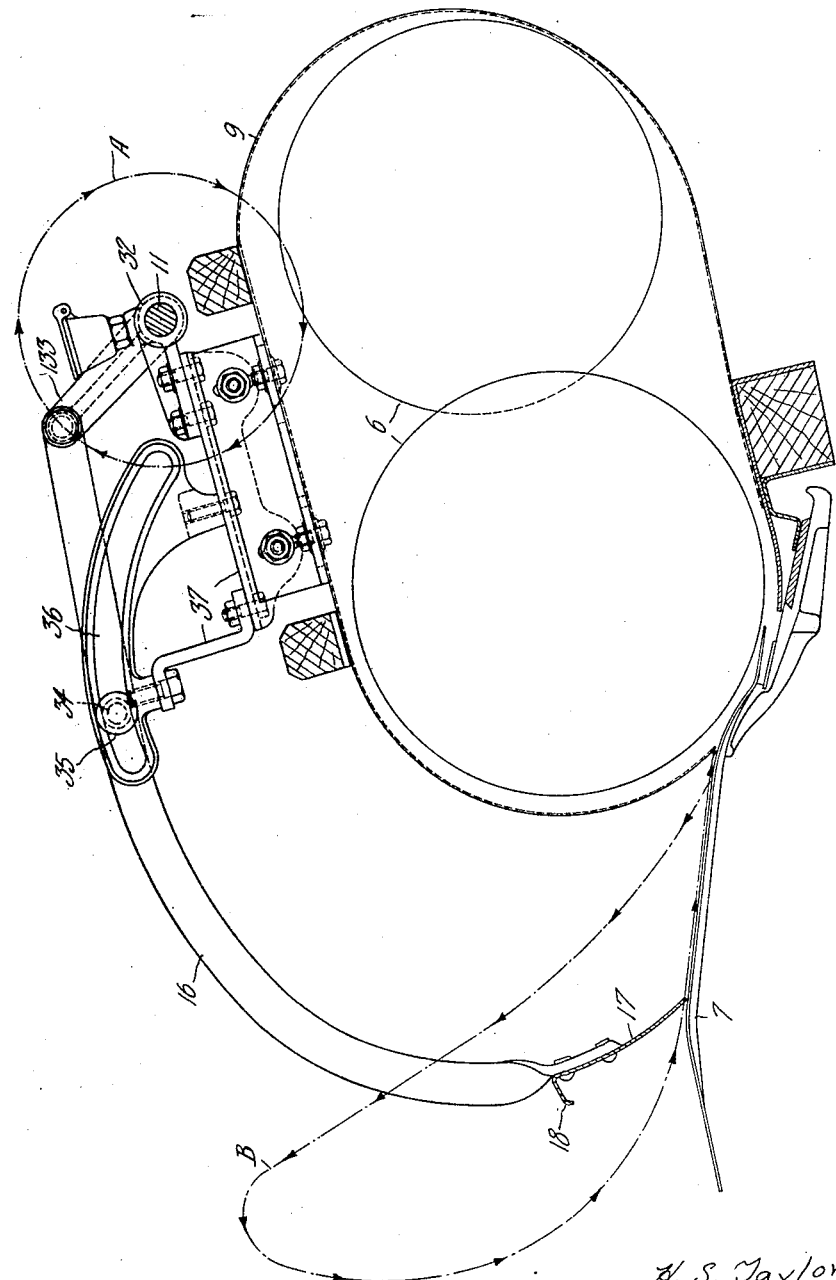

Patented July 19, 1932

1,868,437

UNITED STATES PATENT OFFICE

HEADLIE SHIPARD TAYLOR, OF SUNSHINE, VICTORIA, AUSTRALIA, ASSIGNOR TO H. V. McKAY PROPRIETARY LIMITED, OF SUNSHINE, VICTORIA, AUSTRALIA

APPARATUS FOR GATHERING AND FEEDING IN CROPS

Original application filed October 5, 1928, Serial No. 310,603, and in Australia December 23, 1927. Divided and this application filed January 18, 1930. Serial No. 421,878.

This invention relates to improvements in and connected with apparatus for gathering and feeding in crop to stripper harvesting and reaper-thresher machines and refers especially to apparatus for gathering standing crop in advance of the comb and feeding it rearwardly thereover into the path of movement of rotary beaters or a knife situated in advance of a transverse conveyor or conveyors.

This application is a division of application Serial No. 310,603, filed October 5, 1928.

The object of the present invention is to provide a simple and durably constructed apparatus which will operate efficiently to gather the crop in advance of a comb without threshing the heads thereof, and direct it rearwardly thereover to a rotary beater or a reaping knife in such a way as to prevent choking of the comb and loss of grain.

I accomplish the above mentioned object by mounting a batten or blade rigidly on the front ends of arms associated with and acted upon by cranks to impart forward and rearward movements to the arms and batten, and constraining guides arranged between the cranks and the batten on the arms whereby the batten in its rearward movement will feed the crop into and over the comb and when adjacent to the stripper or reaping mechanism at the base of the comb will move upwardly at an angle and again enter the crop in advance thereof.

In order that the invention may be readily understood reference will now be had to the accompanying drawing in which the figure is a sectional side elevation of the crop gathering and conveying mechanism of a reaper thresher machine fitted with improvements constructed in accordance with the present invention.

In this drawing a practical embodiment of the invention is shown as adapted for use with a reaper thresher having a pair of helical transverse conveyors 6 at the base of a comb 7, a series of brackets 37 is fitted to the top of the casing 9 of the conveyor. The rear end of each bracket 37 supports a bearing 32 in which is rotatively supported a transverse shaft 11 provided with two or more cranks 33 to which are connected the rear ends of arms 16 carrying a batten 17. The cranks 33 preferably are arranged at the ends of the shaft and gearing as 33' (indicated in dotted lines) may be employed for transmitting motion to the shaft from any suitable part of the machine.

The arms 16 at a point in advance of the transverse shaft are fitted with laterally projecting pins 34 carrying flanged rollers 35 which are free to move in curved slotted guides 36 supported above the casing and in advance of the transverse shaft whereby when the shaft is rotated the pins and slotted guides will cause the batten fitted to the forward ends of the arms 16 to move in a path indicated by dotted line B.

The bearings for the crank shaft 11 and the slotted guideways 36 for the pins 34 on the arms may be fitted rigidly to the brackets 37 mounted on the adjustable frame of the machine or upon the casing supporting the reel or transverse conveyor and by adjusting the bracket the operative parts may be readily adapted to different machines.

The forward ends of the arms 16 are curved downwardly and are riveted or otherwise secured to the batten which can be made of sheet metal, as shown.

The brackets 37 are secured by bolts 38 to a supporting member 39 in which slots 40 are provided to permit of the vertical adjustment of the said brackets. The supporting member is bolted to the top of the casing 9 and slots 41 are provided whereby the said members can be adjusted forward or rearward as desired.

The shaft 11 is rotated by approved gearing from any suitable operative part of the machine whereby the cranks 33 will traverse the circular path indicated by the dotted line A.

When the cranks 33 have moved rearwardly approximately one quarter of a revolution from the position shown in the drawing the batten will be located near the inner end of the comb and the rollers 35 will be approaching the rear end of the slotted guides 36. During the next half revolution of the cranks 33 the arms will be oscillated on the pins 34 and the rollers on the pins will have traversed up the slots in the guides to cause the batten on the arms to reach the highest point in its path of movement. During the remaining quarter of a revolution of the cranks 33 the arms will be thrust forwardly and at the same time rocked on the pins 34 to cause the batten to pass downwardly into the position shown in the drawing.

The length and disposition of the cranks 33 and curvature of the guide members 36 will determine the movement of the batten and these elements of the apparatus may be adjusted as above indicated and with respect to each other so as to ensure the batten being moved through a desired path. Moreover the parts can be so arranged that the batten in moving over the comb will bear thereon with sufficient force to ensure the removal of any material which may become jammed between the fingers and interfere with the gathering of the crop.

It will be obvious that the transverse shaft 11 can be made in two or more independent sections and that the arms on each section can be provided with a batten.

When the transverse shaft and batten are formed of two or more independent sections, the different sections of the batten can be arranged to move one in advance of the other so that the whole length of the comb is not being operated on at the one time.

The adjustment provided by the different parts of the invention are essential in view of the fact that harvesting machines are not made with a great degree of accuracy and provision must therefore be made for adjusting the parts of the invention to ensure the best results being obtained from each machine.

I claim:—

1. In apparatus for gathering and feeding in crop to and over the combs of stripper harvesting and reaper thresher machines, a shaft rotatively mounted above and at the rear of a comb, cranks on the said shaft, arms having their rear ends pivotally mounted on the cranks, a batten fitted to the forward ends of the arms, rearwardly and downwardly curved guides located between the batten and the shaft, and pins on the arms engaged by the said guides.

2. In apparatus for gathering and feeding in crop to and over the combs of stripper harvesting and reaper thresher machines, a shaft rotatively mounted above and at the rear of the comb, cranks on the said shaft, gearing for imparting rotation to the shaft, arms having their rear ends pivotally mounted on the cranks, a batten fitted to the downwardly curved front ends of the arms, pins projecting laterally from the arms and supporting anti-frictional rollers, curved guides disposed between the shaft and the batten and engaging the rollers on the pins, and means for adjustably supporting the curved guides.

In witness whereof I hereunto affix my signature.

HEADLIE SHIPARD TAYLOR.